UNITED STATES PATENT OFFICE.

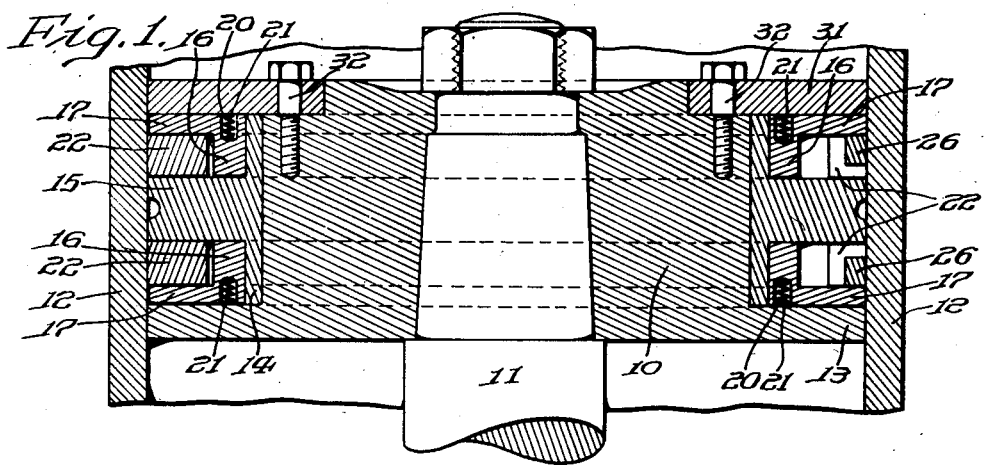

ALFRED DILLON MORRIS, OF PHILADELPHIA, PENNSYLVANIA, ASSIGNOR TO ALFRED W. MORRIS, CHARLES S. WOOD, AND ALFRED DILLON MORRIS, A COPARTNERSHIP, TRADING AS THE MORRIS PISTON COMPANY, OF PHILADELPHIA, PENNSYLVANIA.

PISTON PACKING.

1,405,540.     Specification of Letters Patent.     Patented Feb. 7, 1922.

Application filed February 18, 1921. Serial No. 445,965.

*To all whom it may concern:*

Be it known that I, ALFRED DILLON MORRIS, a subject of the King of Great Britain, and a resident of the city of Philadelphia, county of Philadelphia, State of Pennsylvania, have invented certain new and useful Improvements in Piston Packing, of which the following is a specification.

Some of the objects of the present invention are to provide an improved packing for reciprocable pistons; to provide means for effectually preventing leakage of steam or other pressure medium through joints formed between relatively movable parts; to provide an improved means for preventing pressure leakage at the split portion of a pressure packing ring; to provide means for maintaining a closed joint and even wear between relatively movable parts of a pressure ring; to provide means for preventing excessive pressure from acting on a movable packing ring whereby wear on said packing ring is reduced to a minimum; and to provide other improvements as will hereinafter appear.

In the accompanying drawings, Fig. 1 represents a transverse section of a reciprocable piston with a packing embodying one form of the present invention; Fig. 2 represents an end elevation of the ring packing construction removed from the piston; and Fig. 3 represents a section on line 3—3 of Fig. 2.

Referring to the drawings, one form of the present invention is shown as applied to a piston body 10 fixedly secured to a piston rod 11 and arranged to reciprocate in a cylinder 12.

For the purpose of providing a complete, unitary leak-proof construction the body 10 is circumferentially reduced in diameter in a manner to provide a flange 13 at one end which has a snug circumferential sliding fit with the inner wall of the cylinder 12. This construction also provides a circumferential space for the reception of a bushing 14 which encircles the body 10 and provides a radially disposed flange 15, the outer circumferential face of which is arranged to ride freely upon the inner wall of the cylinder 12. This flange 15 is preferably located at the middle portion of the bushing 14 and is of such thickness as to provide circumferential spaces at each side thereof for the reception of the packing rings.

In the present construction the packing means, located in each space, is similar and therefore but one set will be here described, though like reference numerals will be applied to like parts in both sets.

As a means for retaining the packing means in position and also for supplementing the action thereof, a ring 16 is provided which accurately fits over the bushing 14 and has a radial flange 17, the outer circumferential face of which snugly fits the inner wall of the cylinder 12. At suitable intervals one side of the ring 16 is provided with holes or pockets 20 to receive coil springs 21 respectively which seat against the flange 13 and serve collectively to maintain the ring 16 closely pressed against a side of the bushing flange 15 to insure a tight joint. The body of the ring 16 and the flange 17 provide a circumferential space for the reception of a packing pressure ring 22. As here shown the pressure ring 22 is split as shown at 23 and has its outer circumferential face 24 formed on the same radius as the outer face of the retaining ring flange 17, that is when the ring 22 is compressed within the cylinder 12 its outer face is flush with the face of the flange 17. The inner circumferential face 25 is eccentric with respect to the other ring faces between struck from a center A to the side of the ring 17 center B towards the split 23.

In order to prevent leakage through the split or opening 23 the outer faces of the meeting edges of the ring 22 are milled or otherwise cut away to form a recess for the reception of a plate 26, which is rigidly fastened by rivets 27 or other means to one of the ends of the ring 22, the free end riding freely in the portion of the recess formed in the opposite end of the ring 22.

For the purpose of forming a tight joint between the plate 26 and the ring 22 while permitting free relative movement of the parts the bottom of the recess and the abutting face of the plate 26 are formed as the arc 30 of a circle having its center at C, this being the axis with respect to which expansion of the ring 22 takes place.

While the foregoing description is applied more particularly to the packing devices abutting the flange 13, the packing devices at the opposite end are identical, but are held in place and position by a follower ring 31 which is rigidly fastened to the piston body 10 by studs 32. The follower ring 31 is set into the body 10 to form a flush end for the piston as will be understood.

In assembled condition the two eccentric pressure rings 22 are compressed by the cylinder 12 and seat flush with the retaining ring flange 17, thereby preventing steam or pressure fluid passing axially through the joint formed with the cylinder 12. Likewise, radial leakage of steam or pressure fluid is prevented by the pressure of the springs 21 holding the retaining ring 16 against the flange 15, and the flange 17 against the pressure ring 22. Furthermore the plate 26 effectually seals the ring split 23 and prevents leakage from either end of the piston finding an escape by way of the split 23 in the pressure rings 22.

It should be noted that when the pressure rings 22 are compressed within the cylinder 12, each has an outside diameter the same as that of the retaining rings 16, thereby providing a flush peripheral surface forming a tight joint with the cylinder wall.

Furthermore, by forming the joint between the plate 26 and the bottom of the recess in each of the rings 22, curved or as an arc of a circle, any movement of the plate 26 relative to the ring 22 does not open up any space through which leakage would occur. Also, any wear along this joint will be even and uniform, thus always presenting a leak-proof joint.

The foregoing construction, employing as it does a solid ring in conjunction with a split ring, effectually prevents excessive pressure from acting directly against the split ring, and in consequence there is no excessive wear upon the split packing ring, while the life of the packing is prolonged to a maximum.

Although only a single form is shown in which this invention may be embodied, it is to be understood that the invention is not limited to any specific construction but might be applied in various forms without departing from the spirit of the invention or the scope of the appended claims.

Having thus described my invention, I claim:

1. A piston packing comprising in combination a piston body, a bushing mounted on said body and forming a circumferential groove, a retaining ring encircling said bushing, and a split pressure ring having an eccentric portion, said pressure ring encircling said retaining ring and arranged to press against the inner wall of a cylinder, said rings being located in said groove.

2. A piston packing comprising in combination a piston body, a bushing mounted on said body and forming a circumferential groove, a retaining ring encircling said bushing, a split pressure ring having an eccentric portion, said pressure ring encircling said retaining ring and arranged to press against the inner wall of a cylinder, said rings being located in said groove, and means to prevent leakage of steam or other pressure medium through the split portion of said pressure ring.

3. A piston packing comprising in combination a piston body, a bushing mounted on said body and forming a circumferential groove, a retaining ring encircling said bushing, a split pressure ring having an eccentric portion, said pressure ring encircling said retaining ring and arranged to press against the inner wall of a cylinder, said rings being located in said groove, means to prevent leakage of steam or other pressure medium through the split portion of said pressure ring, and means to press said retaining ring axially of said piston.

4. A piston packing comprising in combination a piston body, a bushing mounted on said body and forming a circumferential groove, a retaining ring encircling said bushing, a split presure ring having an eccentric portion, said pressure ring encircling said retaining ring and arranged to press against the inner wall of a cylinder, said rings being located in said groove, and a plate bridging the space between the meeting ends of said pressure ring to prevent leakage of steam or other pressure medium through said space.

5. A piston packing comprising in combination a piston body, a bushing mounted on said body and forming a circumferential groove, a retaining ring encircling said bushing, a split pressure ring having an eccentric portion, said pressure ring encircling said retaining ring and arranged to press against the inner wall of a cylinder, said rings being located in said groove, a plate bridging the space between the meeting ends of said pressure ring to prevent leakage of steam or other pressure medium through said space, and means to press said retaining ring axially of said piston.

6. A piston packing comprising in combination, a piston body, a bushing mounted on said body and forming a plurality of circumferential grooves, a retaining ring located in each groove and encircling said bushing, and a split pressure ring also in each groove and having an eccentric portion, said pressure ring encircling the respective retaining ring and arranged to press against the inner wall of a cylinder.

7. A piston packing comprising in combination a piston body, a bushing mounted on said body and forming a circumferential groove, a retaining ring encircling said bushing, a split pressure ring having an eccentric portion, said pressure ring encircling said retaining ring and arranged to press against the inner wall of a cylinder, said rings being located in said groove, a plate bridging the space between the meeting ends of said pressure ring to prevent leakage of steam or other pressure medium through said space, and means to prevent leakage of steam or other pressure medium through the split portion of said pressure ring.

8. A piston packing comprising in combination a piston arranged to form a circumferential groove, a retaining ring in said groove, an expansible split ring encircling said retaining ring and having a recess in its meeting ends, and a plate fixed to one end of said split ring and seated in said recess, the joint between said plate and recess being formed as the arc of a circle having the axis of expansion as a center.

9. A piston packing comprising in combination a piston arranged to form a circumferential groove, a retaining ring in said groove, an expansible split ring encircling said retaining ring and having a recess in its meeting ends, and a plate fixed to one end of said split ring and seated in said recess, the joint between said plate and recess being curved.

Signed at Philadelphia, in the county of Philadelphia, State of Pennsylvania, this 4th day of February 1921.

ALFRED DILLON MORRIS.